Aug. 5, 1958 J. E. LOOMIS 2,846,264
LATCH MECHANISM
Filed Dec. 7, 1955 2 Sheets-Sheet 2
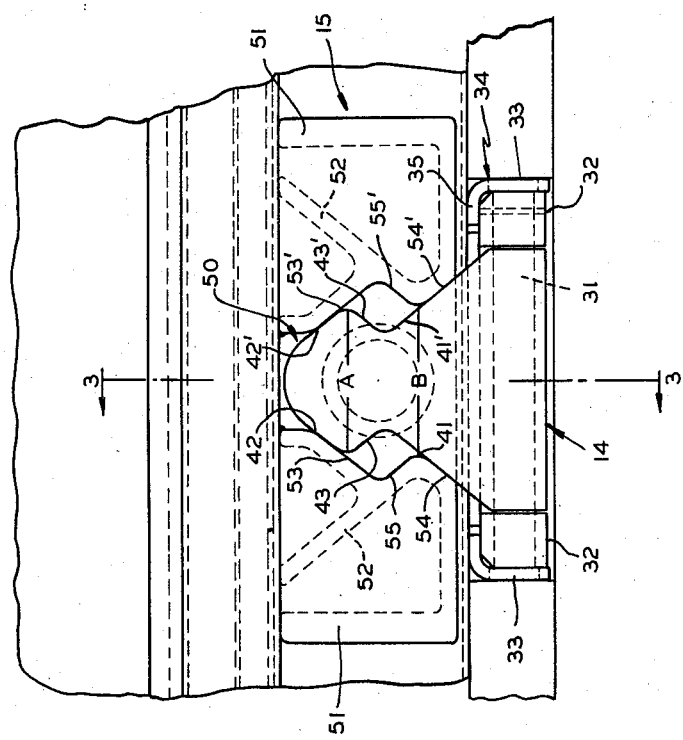
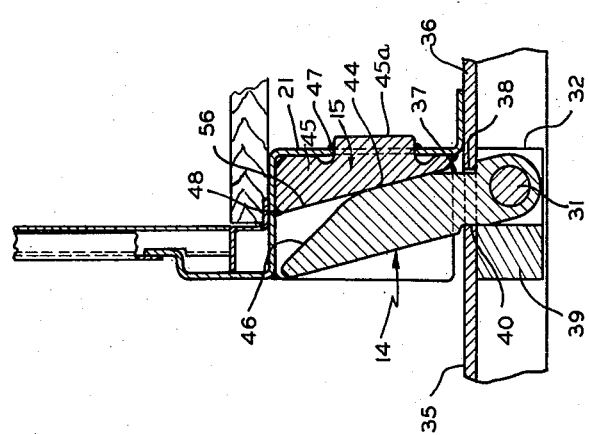
INVENTOR.
JACK E. LOOMIS
BY
ATTYS.

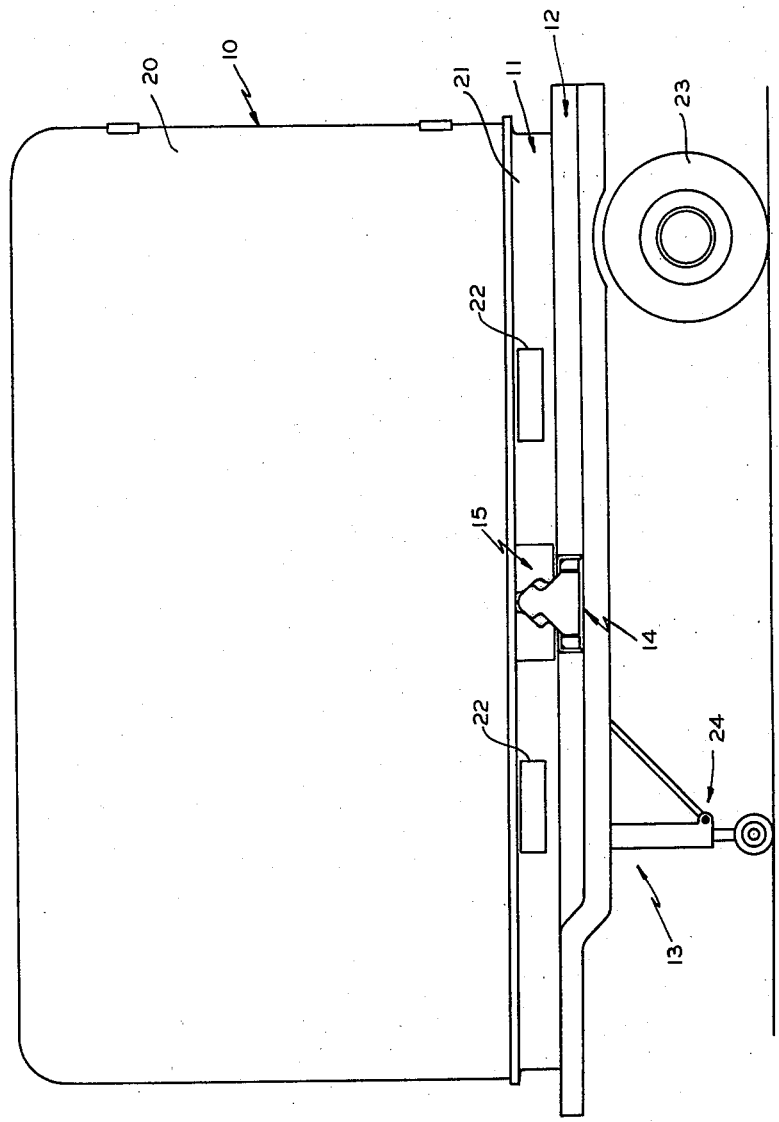

United States Patent Office 2,846,264
Patented Aug. 5, 1958

2,846,264

LATCH MECHANISM

Jack E. Loomis, Battle Creek, Mich., assignor to Clark Equipment Company, a corporation of Michigan Application December 7, 1955, Serial No. 551,584

7 Claims. (Cl. 296—35)

This invention relates generally to freight handling means and equipment in which portable freight carrier means are associated and disassociated with freight transporting means and more particularly concerns an improved latching or fastening mechanism for fixing such portable freight carrier means to the said freight transporting means.

Generally, the invention of subject concerns portable freight handling and carrier devices employed and operated in accordance with the features and concepts set forth in my copending application Ser. No. 531,489 filed on August 30, 1955, which has been abandoned in favor of a continuation-in-part application filed on April 6, 1956, under Ser. No. 577,118 entitled "Freight Handling Means and Methods." Specifically, the present invention relates to an improved anchor means or mechanism for locking a portable freight carrier means to a supporting bed or surface of a freight transporting means. The referred to portable freight carrier means may, in general, be thought of as a supporting base structure carrying a suitable receptacle in which freight to be transported is stored and packed. Such portable freight carrier means is then transported by means of conventional freight or material handling equipment such as fork lift trucks, straddle trucks, cranes and the like to a supporting surface of a freight transporting means such as a railway flat car, trailer truck, airplane, ship or other conventional transporting means.

In brief, the invention about to be disclosed hereinafter, comprises an anchor plate having features of construction, formation and design such that the same may be affixed to the supporting surface of the freight transporting means and disposed in a projecting relationship with respect to such surface. Such projecting anchor means is received in a pocket formed in an anchor casting or pad associated with a portable freight carrier means and an unique arrangement of abutting and guide surfaces provided on the anchor plate and the pocket of the anchor casting substantially translates all horizontal forces applied to the freight carrier means into vertical components to bring opposed abutment surfaces or shoulders of the anchor plate and casting into engagement thereby to securely interlock the freight carrier to the transporting means. Removal of the carrier from the anchor system so provided is afforded only through the application of a vertical lifting force to the freight carrier means.

The main object of this invention is to provide a new and improved anchor system for affixing a portable freight carrier means to the supporting surface of a freight transporting means.

A further object of this invention is to provide a new and improved anchor means or latch mechanism which is capable of effectively preventing the removal of a portable freight carrier means from the supporting surface of a freight transporting means under the application of all horizontal or substantially horizontal forces imposed on said carrier means.

A still further object of this invention is to provide a new, improved and unique means of interlocking two members, one associated with a supporting surface and another associated with a portable structure, in such a manner that the same may be disassociated only by the application of vertical force to one of such members.

A further object of this invention is to provide a new and improved latching mechanism for use in interlocking portable freight carrier means with a supporting surface of a freight transporting means such that all horizontal forces applied to the said portable freight carrier means are resolved into horizontal and vertical force components, the latter of which are substantially combatted and opposed by abutting portions or surfaces of the latching mechanism.

The above and further objects, features and advantages of this invention will appear to those familiar in the art from the following detailed description and specifications therefor and particularly from the discussion of the preferred embodiment of its concepts as found in the device illustrated in the accompanying drawings.

In the drawings:

Figure 1 is a side elevational view illustrating an improved latching mechanism of this invention as associated with a typical freight carrier and freight transporting means;

Figure 2 is a partial enlarged view in side elevation illustrating the details and structural aspects of the improved latching mechanism of this invention; and Figure 3 is a cross-sectional view taken substantially at line 3, 3 of Figure 2 and looking in the direction of the arrows thereon.

As seen best in Figure 1, a portable freight carrier device indicated generally by numeral 10 includes a base structure 11 arranged to be supported on the upper face of a supporting bed 12 of a typical truck drawn trailer indicated generally at 13. An improved anchor plate 14 of my invention is carried by the bed structure 12 of the trailer in such a manner that the same may extend projectingly upward from the supporting surface of such bed to engage and lock with a cooperating anchor casting or pad member 15 associated with the base structure 11 of the freight carrier means. Preferably, in employing the improved latching mechanism of my invention in an arrangement as illustrated in Figure 1, at least two sets of plates 14 and castings 15 are utilized to anchor the portable carrier means to the freight transporting means; one such latching mechanism being disposed at each side of the portable freight carrier means.

Specifically, the freight carrier means 10 includes a body 20 comprising a cubic or substantially cubic enclosure comparing favorably with the normal body portion of a familiar freight transporting truck trailer. The particulars of such a freight carrier means are amply set forth and described in my above referred to copending application and while the enclosed type of freight carrier body structure 20 is illustrated herein, it will be understood that the freight carrier body may assume an open top type arranged to transport granular materials, for example, or a tank type for transporting liquids as well. Be that as it may, the enclosed freight carrier, as illustrated herein, will suffice for present purposes of understanding my invention.

The base structure 11 of the freight carrier means 10 includes a substantially rectangular framework embodying parallel spaced side rails 21 through which at least two fork receptive apertures or openings 22 are provided at spaced intervals. As would be suggested from the term "fork receptive apertures" the openings 22 are designed specifically for the entry of the normal tines or arms of an industrial fork type lift truck so that the freight carrier means 10 may be engaged and transported thereby in loading and unloading the same from a truck trailer of the character illustrated at 13 in Figure 1. Preferably in constructing the base 11 of the freight carrier, a second set of openings 22 will be provided in the opposite side rail 21 (not shown) formulating the opposite parallel side of the rectangular base structure and such two pairs of openings 22 will be interconnected by enclosed channel members or the like formulating a tubular passageway whereby the arms of the lift fork on the industrial lift truck will be received and guided into pockets or channels within the base structure 11.

The supporting bed 12 of the truck trailer 13, comprises the normal construction including deck planking for providing a required supporting surface to the portable freight carrier means 10. The bed 12, as shown, is arranged to be supported on suitable ground engaging wheels 23 and a retractable third wheel 24 according to conventional and known practice.

The improved latch mechanism of my invention includes generally the two major elements, namely a pivotal anchor plate 14 associated with supporting bed 12 of the truck trailer and the anchor pad or casting means 15 associated with the base structure 11 of the portable freight carrier means. The relationship, formation and structural aspects of these two elements may best be understood with particular regard to Figures 2 and 3 of the drawings. As shown in these figures, the anchor plate 14 is formed essentially of triangular elevation of such material as cast steel or the like. Particularly, the member 14 has a widened base portion through which a suitable passageway is formed for receiving a pivotal axle member 31. The ends of the axle 31 are receptive in bearing pads 32 held between depending legs 33, 33 of an inverted C-channel member 34 which is preferably mounted as a portion of the supporting bed or surface of the truck trailer to take the place of a plank removed therefrom. The specific aspects of such channel member 34 and its arrangement transversely of the trailer bed and between the lateral limits thereof is set forth in my above referred to copending application, but briefly such may be described as comprising a metal channel having an upper wall 35 (see Figure 3) and two depending legs 33, as mentioned. Wall 35 includes portions 36 near its opposite ends, each portion being pivotally mounted at one end to comprise a cover plate for an associated anchor plate 14 as the latter is swung downwardly from its projecting Figure 3 position to a substantially horizontal position within the confines of the channel or plank member 34. In this latter regard, it will be understood that two anchor plates are provided on the plank member 34 and that in its raised condition, each anchor plate 14 presents a facial shoulder 37 on its rearward face to an abutting edge 38 of an adjacent cover plate 36 so that the latter may serve to maintain the anchor plate in its raised position. If desired, it is contemplated that the anchor plate 14 may be fixed permanently in its upward projecting position although such is not a preferred structure. In this event the pivoting cover plate 36 will not be required. As shown in Figure 3, however, in addition to the cover plate 36 which acts as an abutment member for maintaining the anchor plate 14 in its upright position illustrated, a block 39 is also provided on the outboard side of each anchor plate and between the leg portions 33, 33 of the channel member 34 to act as a supporting stop for limiting the upward swinging movement of the plates 14. To the latter end each anchor plate is provided with a facial cutout or shoulder 40 for engaging a block member 39.

As best shown in Figure 2, the anchor plate 14 is symmetrically fashioned in substantially a triangular shape as mentioned heretofore and includes two pairs of parallel sloping guide surfaces 41, 42 and 41′, 42′. Specifically, it will be noted that while each pair of sloping surfaces such as surfaces 41 and 42 parallel each other, corresponding sloping surfaces 42, 42′ and 41, 41′ are intersectingly disposed relative to one another adjacent and along opposite peripheral edges of the anchor plate. It will also be regarded that surfaces 41 and 42 are offset in spaced parallelism and that the same are interconnected or joined by a substantially transversely related abutment surface, such as surfaces 43, 43′. The purpose and function of such guide and abutment surfaces 41, 42 and 43 and 41′, 42′ and 43′, thus specified will be set forth presently.

In addition to such guide and abutment surfaces previously ascribed to the anchor plate 14, the same includes a rearward face 44 paralleling a front face 45 thereof; such two faces being intersected by a third sloping surface 46, as best shown in Figure 3 for example, which acts as a guide means as will be related presently.

As mentioned previously, the anchor plate 14 is designed to cooperate and function with the cast anchor pad 15 which is associated with the base structure of the portable freight carrier means. Specifically, two anchor pads 15 are provided, one substantially mid length of each side rail 21 in the carrier base structure 11. Each anchor pad includes a central cast portion 45 having a substantially triangular or wedge shaped cross-section, as best shown in Figure 3, including a projecting boss portion 45a which is designed and intended to invade an opening in the side frame member 21 for proper location. Suitable welds or like fastening connections as indicated at 47 and 48 are employed to fix the anchor pad to the side rail or frame 21. The anchor pad 15 is further distinguished by a central opening or recess 50, as best shown in Figure 2 for example, which lies outboard of and substantially coextensively with the central wedge shaped section 45. At opposite sides of said opening 50 are a pair of abutment portions 51, 51 which may be casted as solid blocks or may be hollow cast with supporting ribs such as 52, shown particularly in Figure 2 of the drawings. Each of the abutment portions 51 includes a pair of parallel sloping guide surfaces such as the surfaces 53, 54 and 53′, 54′ of the left and right hand abutment portions 51 respectively, as seen in Figure 2. Interconnecting such pairs of parallel disposed guide surfaces 53, 54 and 53′, 54′ are substantially transversely related abutment surfaces 55, 55′.

In operation, the surfaces 41, 41′ of the anchor plate means 14 cooperate with surfaces 54, 54′, respectively, of the anchor pad means 15. Likewise, surfaces 53, 53′ cooperate with the anchor plate surfaces 42, 42′ and the abutment surfaces 55, 55′ of the anchor pad cooperate with the parallel abutment surfaces 43, 43′ of the anchor plate. Correspondingly, the sloping face 56 of the wedge shaped portion 45 opposite the central opening 50 of the anchor pad cooperates with the sloping surface 44 of the rear face of the anchor plate, all in a manner as I will now set forth.

It will be understood from examining Figure 3, in particular, that with the anchor plate 14 raised to its projecting condition as shown, the rearward face 44 thereon will engage and slide along the face 56 of the wedge portion 45, as the freight carrier is lowered into position. The lateral spacing between the anchor plates 14 on opposite sides of the truck trailer bed is such that with these plates raised, an interlock thereof with the wedge portions 45 takes place. This wedging engagement between the pad members 15 and the anchor plates 14 serves to substantially eliminate any lateral shifting of the portable freight carrier with respect to the supporting bed of the truck trailer.

Additionally, it will be surmised, again from Figure 2, that the distance "A" measured between the apexual intersections of the surfaces 42, 43 and 42′, 43′ on the anchor plate is slightly less than dimension B as measured between the apexual intersections of surfaces 54, 55 and 54′, 55′ of the anchor pad 15. Therefore, lowering the portable freight carrier vertically onto the projecting anchor plate permits such anchor plate to enter the pocket opening 50 of the anchor pad means 15. When so disposed, surfaces 42, 42' and 53, 53' of the anchor plate and pad means 14 and 15, respectively, will engage with wedging action under the vertical load of the portable freight carrier means. Correspondingly, surfaces 41, 41' of the anchor plate will engage and wedgingly interlock with surfaces 54, 54', respectively, of the anchor pad means 15. Conversely, the abutment surfaces 43, 43' on the anchor plate will lie in spaced parallelism to the abutment surfaces 55, 55' of the anchor pad means 15.

Considering the function of surfaces 42, 42' and 46, it will be understood that the latter surface 46 serves to initially guide the wedge members 45 onto and behind the anchor plate members 14, thus providing a lateral guide means. Surfaces 42, 42' of the anchor plate likewise serve as a guide means, but against longitudinal displacement of the freight carrier means with respect to the anchor plate. Specifically, as the load or freight carrier means 10 is lowered onto the anchor plate means 14, sloping guide surfaces 42, 42' initially operate with the sloping surfaces 54, 54' of the anchor pad means 15 to pilot the anchor plate into the central openings 50 of the anchor pad means.

Once the anchor plate and anchor pad members are organized or interfitted, as illustrated in Figure 2, for example, the interlocking functional cooperation of surfaces 41, 41' and 43, 43' with their respectively associated surfaces 54, 54' and 55, 55' of the anchor pad means comes about. Since the predominating forces on the loaded freight carrier means 10 are horizontal during transportation, as for example forces caused by inertia or momentum of the freight carrier means, it may be presumed that the predominating movement of the freight carrier means relative to the anchor plate means 14 will be that of horizontal translation along the supporting bed 12 of the truck trailer. It will be immediately recognized therefore that the application of such horizontal forces to the freight carrier means will cause the anchor pad means to move upwardly along the sloping surface 41, 41' of the anchor plate means thereby to bring either one of the pairs of the opposed abutting surfaces 43, 55 or 43', 55' of the anchor plate and anchor pad means, respectively, into interfering contact. Such interfering contact between these surfaces will, of course, effectively interlock the anchor plate to the anchor pad means. Therefore it will be understood that the application of horizontal force to the freight carrier means serves to resolve such force into a combination of horizontal and vertical components, the vertical components thereof serving to lift the freight carrier means upwardly while the horizontal component shifts the same horizontally. In effect, this action moves the surfaces 54, 54' along the slope of surfaces 41, 41' to interlockingly engage the parallel opposed abutting faces 43, 55 and 43', 55' as related. Conversely, upon the cessation of such horizontal forces on the freight carrier means, the presence of the downwardly sloping guide surfaces 41, 41' serves to return the freight carrier means to the supporting surface of the truck trailer.

Desired disengagement of the freight carrier means and freight transporting means is brought about when the transporting means has come to a stop or rest position whereat the arms of a fork lift truck may enter the openings 22 in the side rails of the freight carrier means to lift the same vertically upward. It will be appreciated that since the distance "A" is less than the distance "B," as shown in Figure 2 above, rectilinear vertical movement of the freight carrier means upwardly with respect to the underlying support surface of the freight transporting means will readily permit the disengagement of such two means and the latching members 14 and 15 as described.

From the foregoing, it is believed that those familiar with the art will readily recognize, appreciate and understand the novel concepts and features of the improved latching mechanism herein described and shown. Obviously, while the invention has been related to a particular preferred embodiment thereof, numerous changes, modifications and substitutions of equivalents may be made therein without necessarily departing from the spirit and scope of the invention concerned. As a result, it is not my intention to be limited to the particular form of the invention herein illustrated and described except as may appear in the following appended claims.

I claim:

1. A latching mechanism of the class described, comprising, an anchor plate member, a first fixed abutment portion on said plate member, an anchor pad member having a recess axially receptive of said plate member, a second fixed abutment portion on said pad member and normally lying in spaced relation with respect to said first abutment portion, and plural inclined guide means on each of said members for piloting said plate member axially into said recess and for transposing relative movement of said members in a first direction in the plane of said recess into relative movement thereof in a second direction substantially transverse to said first direction, said relative movement of said members in said second direction effecting interfering alignment of said abutment portions, movement of said plate member coaxially of said recess permitting bypassing of said abutment portions.

2. A latching mechanism of the class described, comprising, an anchor plate having a first guide surface and a first abutment surface, an anchor pad member having a recess defining at its periphery a second guide surface paralleling said first guide surface and a second abutment surface paralleling said first abutment surface, said first and second guide surfaces engaging each other along a plane disposed at an angular relation to the horizontal, and said first and second abutment surfaces normally lying in superposed relation whereby relative horizontal movement between said anchor plate and pad means produces sliding movement of one of said guide surfaces along the slope of the other of said guide surfaces to effect engagement of said abutting surfaces, movement of said plate along the vertical axis of said recess permitting withdrawal of said anchor plate from said recess and the bypassing of said abutment surfaces.

3. A latching mechanism of the class described, comprising, an anchor plate member having a first guide surface at one edge and an abutment surface traversing and extending outwardly of said guide surface, an anchor pad member having a recess receptive of said plate member and defined at its periphery by a second guide surface paralleling said first guide surface and a second abutment surface paralleling said first abutment surface, said first and second guide surfaces normally engaging each other along a plane disposed at an angle in relation to the horizontal, said first and second abutment surfaces normally lying in superposed spaced parallelism, relative movement between said two members in a horizontal direction and in the plane of said plate member causing the inter-engaging guide surfaces to move along their plane of contact and effect engagement of said abutting surfaces to prevent withdrawal of said plate member from said recess, and wedge means on said pad member for substantially preventing relative movement between said two members in a direction transverse to the plane of the plate member.

4. For use in interlocking a portable freight carrier means to a supporting surface of a freight transporting means of the class described, an improved latching mechanism, comprising, an anchor plate member having a substantially triangular shaped profile, means for pivotally mounting said plate member to the transporting means for movement about an axis paralleling the supporting surface thereon, a first abutment surface formed in the profile of said plate means, an anchor pad means mounted on the freight carrier means and presenting a recess of substantially triangular profile for the reception of said plate member, a second abutment surface formed in the profile of said recess, means for locking said anchor plate member in a substantially vertical position so that the same projects upwardly from the supporting surface of the freight transporting means, first and second guide surfaces at the base of said plate member and pad means, respectively, and inclined to the horizontal, movement of the freight carrier means relative to the supporting surface of the transporting means and in directions paralleling the plane of said anchor plate member serving to effect relative movement between said plate member and pad means in a direction defined by the slope of the plane of contact for said guide surfaces to bring said two abutment surfaces into engagement and thereby prevent withdrawal of said plate member from said recess.

5. A latching mechanism of the class described, comprising, an anchor plate member, a first abutment portion on said plate member, an anchor pad member having a recess axially receptive of said plate member, said plate member being rectilinearly insertable into said recess along the latter's vertical axis, a second abutment portion on said pad member projecting inwardly of said recess and normally disposed in spaced parallelism with said first abutment portion when said anchor plate is in said recess, and a pair of guide surfaces disposed at an angle with respect to the horizontal for transposing relative horizontal movement of said members into relative movement thereof in a vertical direction and vice versa, one of said surfaces being formed on said plate member and the other of said surfaces being formed on said pad member with said two surfaces being engaged in the normal disposition of said plate member in said recess, relative movement of said two members other than along the axis of said recess producing abutting engagement of said abutment portions to interlock said members, the said plate member being freely withdrawn from said recess along the latter's vertical axis without engagement of said abutment portions.

6. In a latching mechanism, a pad member having a recess, a first fixed abutment means in said recess, first guide means on said pad member, an anchor member insertable into and retractable from said recess along a rectilinear path coaxial with said recess, second guide means on said anchor means normally engaging said first guide means, and second fixed abutment means on said anchor means normally lying in spaced parallel relation with said first abutment means, said two named guide means coacting upon relative movement of said two members in directions traversing said rectilinear path to interfittingly interpose said first and second abutment means and thereby prevent withdrawal of said anchor member from said recess.

7. In a latching mechanism, a pad member having a recess, first aubtment means in said recess, first guide means on said pad member within said recess, second guide means on said pad member adjacent said recess, an anchor member insertable into said recess along a rectilinear path, third guide means on said anchor member normally engaging said first guide means, fourth guide means on said anchor member normally engaging said second guide means, second abutment means on said anchor member normally lying in spaced relation with said first abutment means when said anchor member is in said recess, said first and third guide means coacting upon relative movement of said two members in directions traversing said rectilinear path to interfittingly interpose said first and second abutment means and prevent rectilinear withdrawal of said anchor member from said recess, said third and fourth guide means coacting with said second guide means to pilot said anchor member into said recess.

References Cited in the file of this patent

UNITED STATES PATENTS

| 1,403,568 | Rodowicz | Jan. 17, 1922 |
| 1,814,304 | Fitch | July 14, 1931 |
| 2,539,201 | Pasko | Jan. 23, 1951 |

FOREIGN PATENTS

| 703,841 | Germany | Mar. 17, 1941 |